Figure 1:
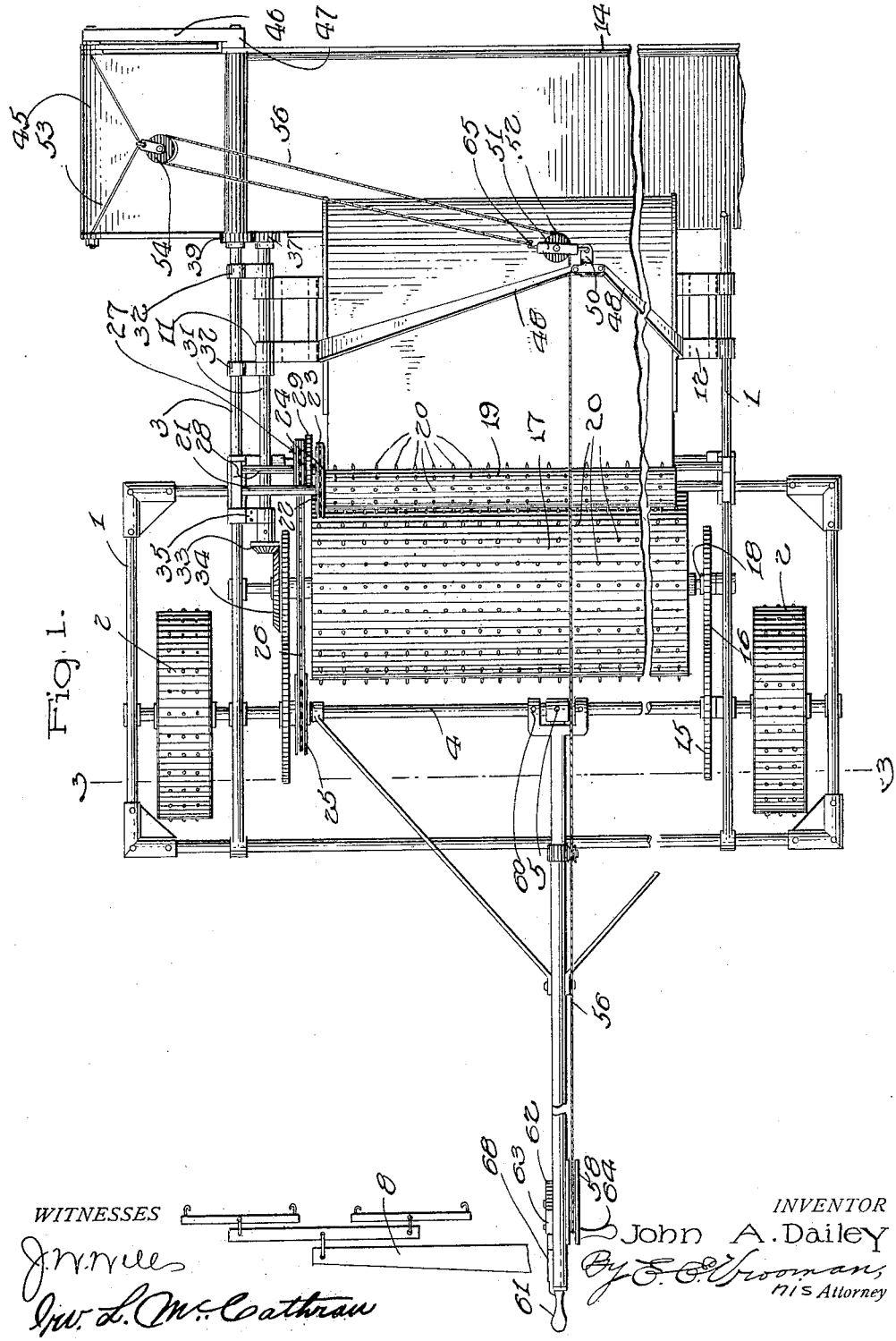

J. A. DAILEY
CONVEYER.
APPLICATION FILED MAY 1, 1912

1,108,713.

Patented Aug. 25, 1914.
3 SHEETS—SHEET 1.

WITNESSES

INVENTOR
John A. Dailey
His Attorney.

J. A. DAILEY.
CONVEYER.
APPLICATION FILED MAY 1, 1912.
1,108,713.
Patented Aug. 25, 1914.
3 SHEETS—SHEET 2.
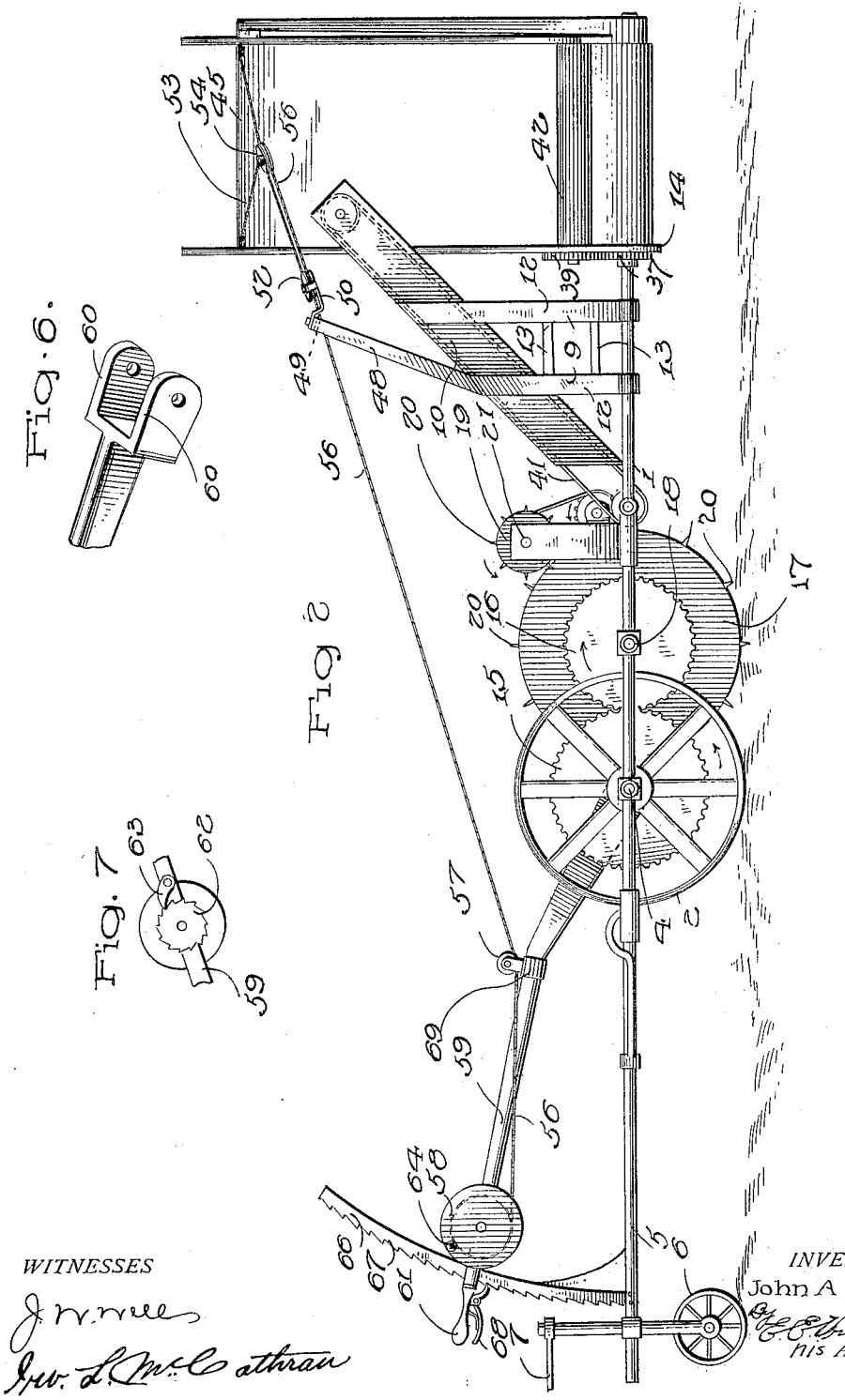
WITNESSES
INVENTOR
John A. Dailey
his Attorney.

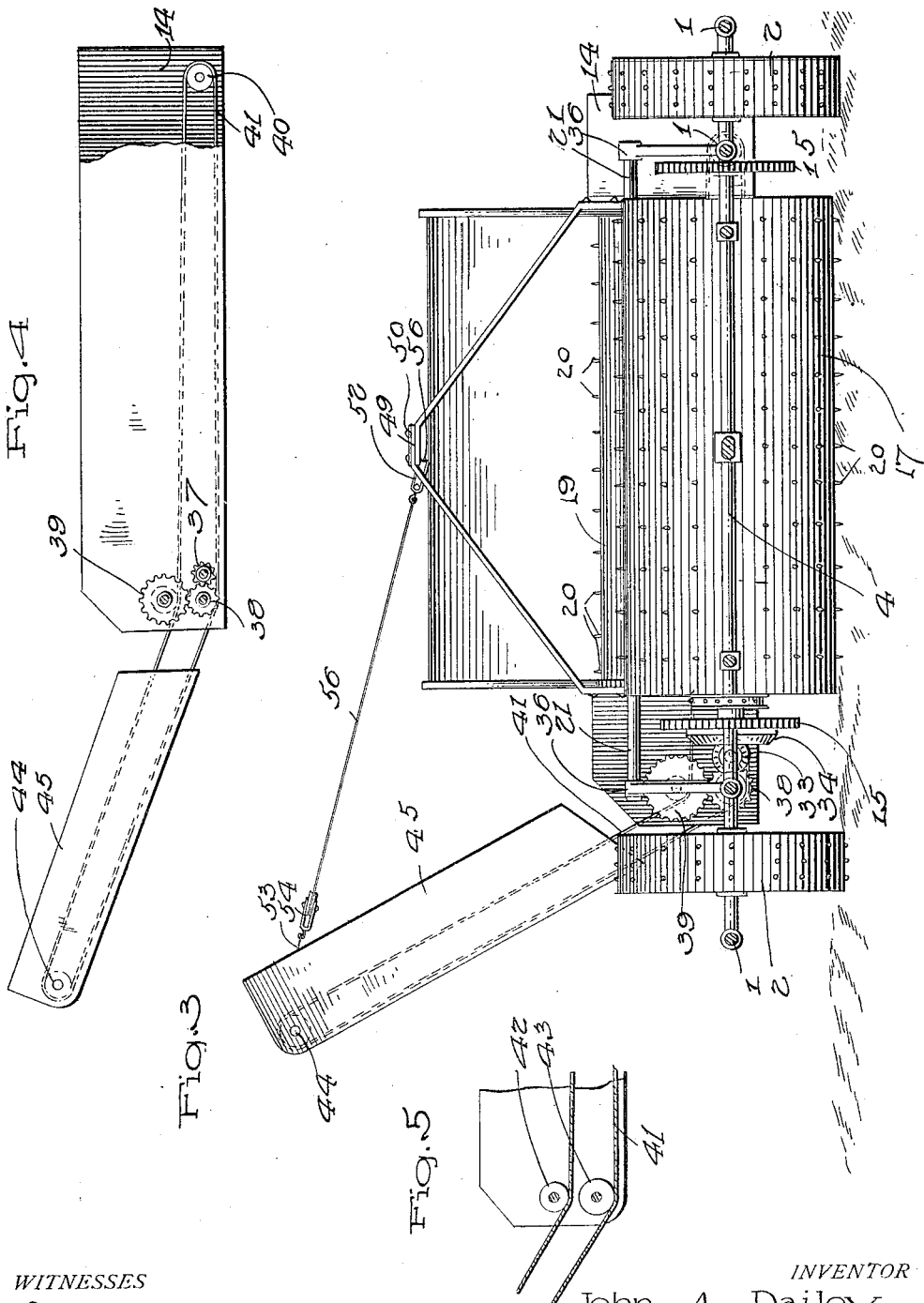

UNITED STATES PATENT OFFICE.

JOHN A. DAILEY, OF LA CROSSE, KANSAS.

CONVEYER.

1,108,713.  Specification of Letters Patent.  Patented Aug. 25, 1914.

Application filed May 1, 1912. Serial No. 694,563.

*To all whom it may concern:*

Be it known that I, JOHN A. DAILEY, a citizen of the United States, residing at La Crosse, in the county of Rush and State of Kansas, have invented certain new and useful Improvements in Conveyers, of which the following is a specification, reference being had therein to the accompanying drawing.

This invention relates to conveyers and hay loaders and has for its object the production of an efficient means whereby the outer end of the conveyer may be raised and lowered in such a manner as to facilitate an efficient adjustment of the outer conveyer which is adapted to overhang a vehicle, which vehicle, is adapted to receive the hay or other material from the conveyer.

Another object of this invention is the production of an efficient bracing means for supporting the operating mechanism whereby the outer end of the conveyer may be elevated or lowered.

With these and other objects in view, this invention consists of certain novel constructions, combinations and arrangements of parts, as will be hereinafter fully described and claimed.

In the drawings: Figure 1 is a top plan view of the hay loader. Fig. 2 is a side elevation thereof. Fig. 3 is a section taken on line 3—3 of Fig. 1. Fig. 4 is a side elevation looking from the inner side of the machine and which extends transversely of the machine. Fig. 5 is a fragmentary longitudinal section showing the manner in which the conveyer aprons pass under the guide rollers. Fig. 6 is a perspective view of the inner end of the operating lever for controlling the elevation of the conveyer. Fig. 7 is a side elevation of the ratchet device for controlling the winding drum whereby the conveyer is elevated.

By referring to the drawings, it will be seen that 1 designates the main framework which passes around the front of the machine, and also around the supporting wheels 2. The frame is also provided with longitudinally extending rods 3, which rods 3 are engaged at their respective ends of the frame 1. An axle 4 is carried by the wheels 2 and to this axle is connected a draft pole 5 which draft pole is supported at its outer end by means of a caster 6. The ordinary guide means 7 is attached to the caster 6 so as to guide the machine in its correct or desired direction. The usual draft trees 8 are carried by the outer end of the shaft 5, to which the usual draft animals may be hitched. An auxiliary supporting frame 9 is carried by each of the side members 3 and supports the rear end of the conveyer frame 10, hereinafter described.

The frame 9 comprises a loop portion 11, and a plurality of vertical standards 12, which standards are connected by means of truss bars 13. The outer ends of the bars 3 support the conveyer frame 14 which frame runs at right angles to the conveyer frame 10, and is adapted to receive the discharge from said conveyer frame 10 as will be hereinafter described.

A gear wheel 15 is carried near each end of the shaft 4 intermediate the supporting wheels 2, said gear wheels meshing with auxiliary gear wheels 16 for driving the main picking or lifting roller 17. The gears 16 are keyed to the shaft 18, which shafts support the picking or lifting roller 17. A cleaning roller 19 is supported by the side members 3, and said rollers 17 and 19 are provided with spurs 20 for more readily engaging the hay so as to elevate the same upon the conveyers. The roller 19 is supported by means of a shaft 21, which shaft carries a sprocket wheel 22 geared to a sprocket 23 by means of a sprocket chain 24. A driving sprocket 25 is carried by the axle 4, and a sprocket chain 26 gears this sprocket 25 to a sprocket 27 carried by the shaft 28. A gear 29 is carried by the shaft 28, and this gear 29 meshes with a gear carried by the shaft which supports the sprocket wheel 23. In this manner rotary movement will be imparted to the cleaning roller 19.

A shaft 31 is supported longitudinally of one of the side members 3 by means of strap braces 32, and this shaft carries a beveled gear 33, which meshes with the beveled gear 34 carried by the shaft 18. This shaft 31 is also braced by means of a bracing frame 35. The outer end of the shaft 31 is supported by vertically extending arms 36, as illustrated in Fig. 3. The rear end of the shaft 31 is provided with a gear wheel 37, which gear wheel 37 meshes with a gear 38, said gear 38 in turn meshing with a gear 39. A roller 40 is carried by the frame 14, and from this roller passes the conveyer apron 41. The gear wheel 39 is carried by a guide roller 42, and the gear wheel 38 is carried by a guide roller 43. The conveyer apron passes under the guide rollers 42, and up over the guide roller 44 carried by the upper end of the outer conveyer 45, and then down under the guide roller 43, and back over the guide roller 40. The conveyer 45 is supported by means of a bracing arm 46, which arm is pivotally secured to the outer end of the conveyer 14, as indicated at 47.

One of the side arms 12 of each of the frames 9 extends upwardly and converges toward its upper end so as to form a supporting frame 48. The upper ends of the supporting frame have their ends overlapped as indicated at 49 and to these frames is connected a pulley block support 50. This support 50 engages a block 51, and this block carries a pulley 52. The outer end of the conveyer 45 is provided with a supporting cable 53, which cable carries a pulley block 54. A cable 56 is secured to the block 51 as indicated in Fig. 1, and passes over the pulley 54 and back over the pulley 52. From this position the cable 56 passes over a pulley 57 and is then wound upon a winding drum 58. An operating lever 59 is pivotally secured to the axle 4 as indicated in Fig. 1, and is provided with a bifurcated end 60 for straddling the draft beam 5. The outer end of the lever 59 is provided with a handle 61 for facilitating the raising and lowering of the lever 59. The drum 59 coöperates with the ratchet wheel 62, which wheel is carried upon the opposite side of the lever 59, and this ratchet is held against rotation in one direction, by means of a pawl 63. The drum 58 is provided with a handle 64, for facilitating the winding of the drum. It will be seen that when the conveyer 45 is desired to be elevated, the drum 58 may be wound so as to wind the cable 56 thereon. By so winding the cable, it will be seen that the upper end of the conveyer will be raised for the reason that the inner end of the cable 56 is fixedly secured to the hook 65, as indicated in Fig. 1. A rack bar 66 is supported upon the beam 5, and is struck on the arc of a circle for allowing the lever 59 to be operated in the desired manner. Ratchet teeth 67 are formed upon the outer face of the rack bar 66, and are adapted to coöperate with a latching lever 68, said latch being adapted to hold the lever in a locked position relative to the beam. It should be understood that the drum 58 is adapted to raise the outer end of the conveyer when the same is desired to be swung to any considerable extent, but when it is desired to have the conveyer raised upon the upper end of the vehicle, working with the hay loader, the lever is brought to such a position upon the rack bar 66 as to keep the conveyer in engagement with the vehicle. After the vehicle has been loaded, and it is desired to place another vehicle in the place of the loaded vehicle, it is not necessary to rotate the drum, and wind the cable 56 thereon for the lever 59 may be moved downwardly upon the rack bar 66 a sufficient distance to relieve the weight of the outer end of the conveyer from off the side of the vehicle working with the hay loader a sufficient distance to allow the vehicle to pass from under the same. The pulley 57 is supported upon the lever 59 by means of a collar 69.

From the foregoing description, it will be seen that a device has been produced which will control the conveyers in such a manner as to readily raise the outer ends of the conveyer 45 by winding the drum, or when it is only desired to raise the conveyer for a slight distance, the same function may be accomplished by operating the lever upon the rack bar 66.

What is claimed is:—

A loading device comprising a portable frame, a pair of upright bars carried thereby and having their upper ends in convergent relation and overlapped, a pulley carried by the overlapped ends of the arm, an operating lever pivotally connected to the frame, a winding drum carried by the lever, a pulley carried by the lever, a cable wound upon the drum, passing over the pulleys, a conveyer carried by the frame and adjusted by the cable, and means for locking the lever in the desired adjustment.

In testimony whereof I hereunto affix my signature in presence of two witnesses.

JOHN A. DAILEY.

Witnesses:
 FRED'K ALLBERT,
 FRANK W. RUSSELL.

Copies of this patent may be obtained for five cents each, by addressing the "Commissioner of Patents, Washington, D. C."